United States Patent [19]

Hüttlin

[11] Patent Number: 4,674,198

[45] Date of Patent: Jun. 23, 1987

[54] APPARATUS FOR GRANULATING, PELLETING, AND COATING AND/OR DRYING FLUID MATERIALS

[76] Inventor: Herbert Hüttlin, Daimlerstrasse 7, 7853 Steinen, Fed. Rep. of Germany

[21] Appl. No.: 888,747

[22] Filed: Jul. 22, 1986

[30] Foreign Application Priority Data

Mar. 17, 1986 [DE] Fed. Rep. of Germany ....... 3608885

[51] Int. Cl.⁴ .......................................... F26B 11/04
[52] U.S. Cl. ...................................... 34/135; 34/142; 414/149; 414/586; 432/117; 432/239
[58] Field of Search .................. 432/108, 117, 239; 414/149, 210, 586; 34/135, 136, 137, 141, 142, 56

[56] References Cited

U.S. PATENT DOCUMENTS

| | | |
|---|---|---|
| 3,334,868 | 8/1967 | Lage . |
| 3,385,724 | 5/1968 | Grun . |
| 3,386,182 | 6/1968 | Lippert . |
| 3,411,480 | 11/1968 | Grass, Jr. et al. . |
| 4,002,325 | 1/1977 | Herfeld . |
| 4,037,331 | 7/1977 | Brilloit ................................ 34/135 |
| 4,050,406 | 9/1977 | Reni . |
| 4,168,914 | 9/1979 | Larson et al. . |
| 4,217,851 | 8/1980 | Biehl et al. . |
| 4,425,865 | 1/1984 | Horner et al. . |

FOREIGN PATENT DOCUMENTS

| | | |
|---|---|---|
| 0072467 | 2/1983 | European Pat. Off. . |
| 872928 | 7/1952 | Fed. Rep. of Germany . |
| 1849891 | 10/1961 | Fed. Rep. of Germany . |
| 1577729 | 4/1965 | Fed. Rep. of Germany . |
| 1297447 | 6/1966 | Fed. Rep. of Germany . |
| 1632404 | 2/1968 | Fed. Rep. of Germany . |
| 2222957 | 10/1974 | France . |
| 2299903 | 10/1976 | France . |
| 38538 | 1/1960 | German Democratic Rep. . |
| 264592 | 10/1949 | Switzerland . |
| 2043219 | 11/1980 | United Kingdom . |

Primary Examiner—Larry I. Schwartz
Attorney, Agent, or Firm—Brumbaugh, Graves, Donohue & Raymond

[57] ABSTRACT

The apparatus comprises a drum (10) adapted to be driven in rotation about a horizontal axis of rotation (A) and having an at least approximately cylindrical body (12) as well as two steep end walls (14), one at each side of the body (12). The two end walls (14) each include a radially outer crown of ring sectors (20) which are inclined in overlapping relationship such that their leading edges (22) in the operating direction of rotation (26) of the drum (10) are disposed axially further outside than their trailing edges (24). A gap-like passage (28) each is formed between adjacent ring sectors (20). The material (58) being treated may exit through these passages upon rotation of the drum (10) in reverse sense. The ring sectors (20) are followed radially inwardly by a central portion (18,42) of the respective end wall (14) which portion the material (58) cannot penetrate. This makes sure that the material (58) will revolve without disturbance within the forwardly rotating drum (10).

10 Claims, 6 Drawing Figures

APPARATUS FOR GRANULATING, PELLETING, AND COATING AND/OR DRYING FLUID MATERIALS

The instant invention relates to an apparatus for granulating, pelleting, coating and/or drying fluid materials, comprising a drum adapted to be driven in rotation about an at least approximately horizontal axis of rotation and having an at least approximately cylindrical body and two steep end walls, one at each side of the body.

With known apparatus of this kind it is customary to empty the drum upon completion of the treatment by sucking the material out through a hose. Now, if the material treated, such as sugar-coated material having been given a surface which is sensitive to shocks, does not withstand the impacts which are bound to happen in the course of the aspiration procedure, it is a cumbersome and time consuming process to fully evacuate the drum. If the end walls are designed to be frustoconical and directed axially outwardly away from the body (FR-A-2 222 957), it is possible basically to empty the drum by putting it in an inclined position so that the material may flow out through a central aperture formed in one of the end walls. With other known apparatus of the generic kind in question (EP-A-0 072 467) likewise including a drum with frustoconical end walls which, however, extend into the space enclosed by the body, it is more difficult to obtain complete evacuation because there is no position of the drum at which the material could flow out readily through an opening in the middle of one of the end walls. The same is true if the drum is supported in such manner that it cannot be tilted.

To accomplish the discharge, up to now a collecting pan had to be placed in the drum in such manner that the material would get into the same at a certain direction of rotation of the drum and then be passed on to the outside, for instance by way of a chute. The collecting pan then had to be disassembled for normal operation of the drum. With a big drum the collecting pan is of such heavy weight that it requires considerable force or even hoisting tools to assemble and disassemble it.

It is an object of the invention to develop an apparatus of the kind specified initially such that it becomes much easier to empty the drum.

This object is met, in accordance with the invention, in that at least one of the end walls of the drum comprises a radially outer crown of ring sectors being inclined in overlapping relationship such that their leading edges in the operating direction of rotation of the drum are disposed axially further outside than their trailing edges, that a gap-like passage each is formed between adjacent ring sectors through which passages the material may exit upon reverse rotation of the drum, and that the ring sectors are followed radially inwardly by a central portion of the respective end wall which portion is not penetrable by the material.

In the operating direction of rotation the obliquely positioned ring sectors keep the material inside the drum and enhance the tendency of the drum to take along the material in the rotating sense so that inside the drum the material being treated will experience the desired cataract-like motion in response to the revolving speed of the drum, the inclination of the ring sectors, and finally also the nature of the material. During such motion the individual particles of the material roll off one on the other so that all particles of the material are subjected substantially uniformly to the respective treatment being carried out inside the drum. This may consist, for example, of spraying a sticky liquid on the material or drying it by heated air. The resulting product thus will be homogeneous granules or the like. The central portion which the material cannot penetrate and which preferably is made rather smooth in the or each end wall of the drum, which wall is provided with the radially outer ring sectors, contributes to the unrestrained development of the cataract-like movement of the material within the drum and prevents any fractions of the material worth mentioning from leaving the drum prematurely even if the drum is rather filled up. As soon as the direction of rotation of the drum is reversed, the material will flow out of the drum within little time.

If both end walls of the drum are designed in accordance with the instant invention, the complete discharge of the material flowing out when the drum is rotated in reverse sense may be promoted by giving the body of the drum a shape which deviates from an exact cylinder in that the central zone has an inner diameter somewhat smaller than the inner diameter at end sections of the drum on each of which borders a crown of ring sectors. On the other hand, if only one end wall of the drum is designed according to the invention, preferably the entire inside wall of the drum is rendered conical such that a minor gradient is obtained in the direction of the end wall designed in accordance with the invention.

Preferably an annular collecting channel is formed axially outside the ring sectors and at the drum to receive material which exited through the passages.

The gap-like passages formed between the ring sectors may be used additionally in an especially advantageous manner to assure that in operation a gas used for drying will flow particularly uniformly through the material. To this end the invention is developed further in that a suction chamber is arranged axially outside of the ring sectors below the axis of rotation and is adapted to be connected to a suction conduit for sucking gas out of the material.

Preferably the suction chamber is defined axially outwardly by a stationary hood which substantially covers the respective end wall of the drum. The hood at the same time serves to preclude accidents because it wards off unauthorized persons and prevents any unintentional touching of the ring sectors while the drum is revolving.

Preferably the central portion which is not penetrable by the material comprises a central cover which, in operation, closes an opening formed in the middle of the corresponding end wall of the drum. The central cover preferably is pivoted at the hood.

A discharge flap preferably is arranged at the hood below the central cover. Rather than having to remove the hood for discharge, in this manner it will be sufficient to open the discharge flap.

The central aperture preferably is surrounded by a planar annular zone of the end wall belonging to the central portion which the material cannot penetrate.

Finally, it is advantageous if the configuration of the ring sectors approaches a frustum which extends in per se known manner (EP-A-0 072 467) into the space enclosed by the body. In this manner the forces of entrainment exerted on the material by the obliquely positioned ring sectors when the drum revolves in the operating direction of rotation act complementary to the constriction which the material undergoes by virtue of the overall conical shape defined by the ring sectors and likewise enhancing the entrainment of the material by the rotating drum.

The invention will be described further, by way of example, with reference to the accompanying drawings, in which.

Figure 3:
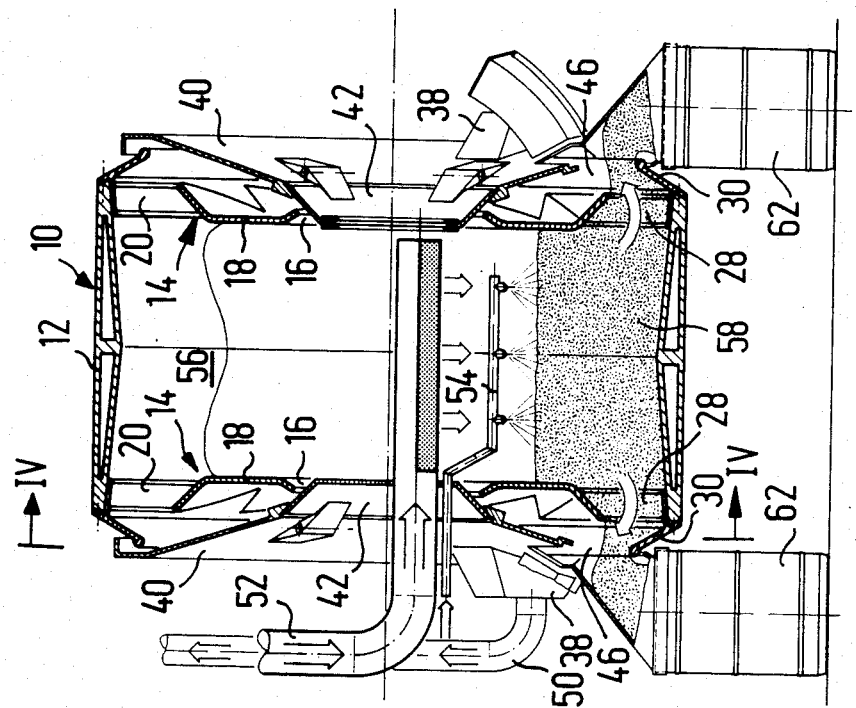
FIG. 3 is a vertical axial sectional view along lines III—III of FIG. 2.
Figure 6:
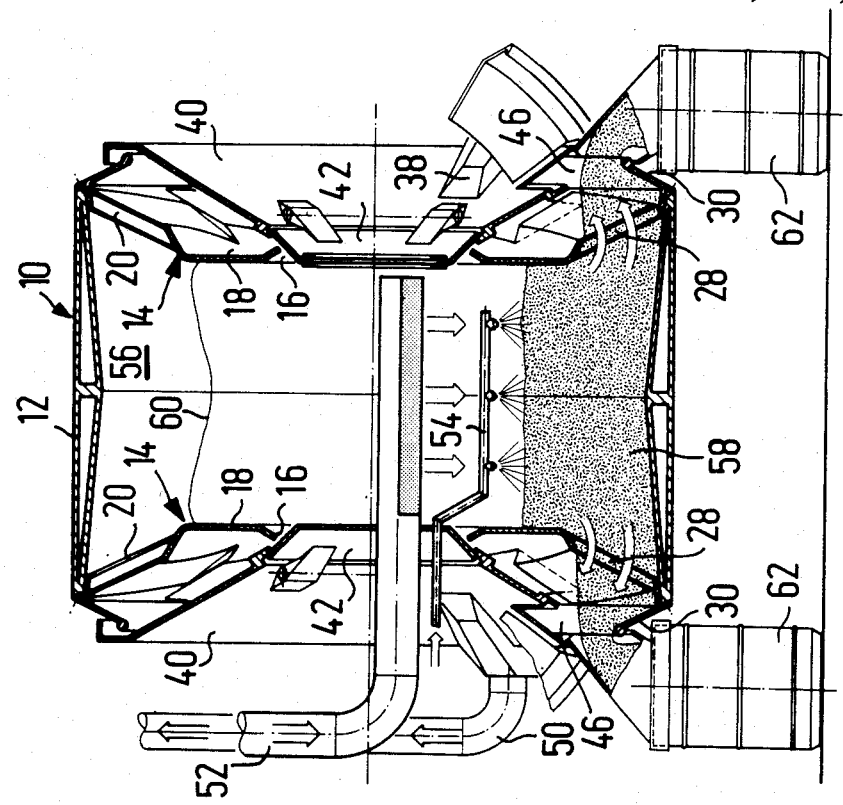
Figure 5:
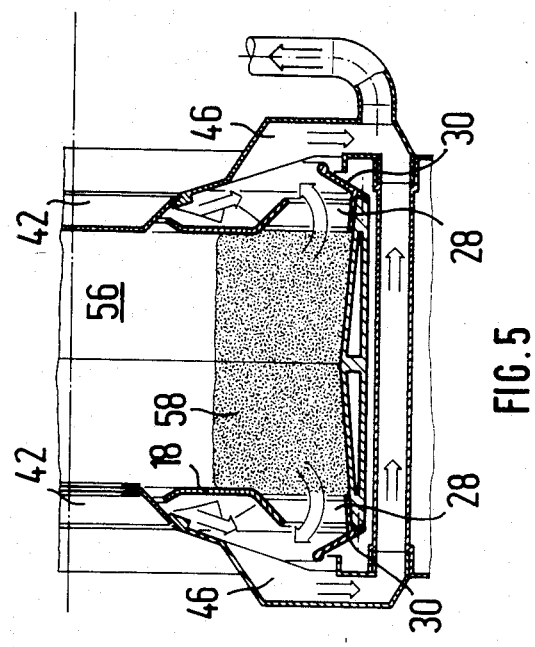
FIG. 5 is an axial part sectional view along lines V—V of FIG. 1.

FIG. 6 an axial sectional view corresponding to FIG. 3 but showing a modified embodiment.

The apparatus shown in FIGS. 1 to 5 comprises a drum 10 which is rotatable about a horizontal axis of rotation A and includes a double-walled body 12 as well as a pair of end walls 14. The body 12 is cylindrical at its outside and has a double conical inside such that its inner diameter is smallest in the central area and becomes greater uniformly toward both end walls 14.

Both end walls 14 are formed with a circular central aperture 16 surrounded by a planar, smooth annular zone 18 and, radially further outwardly, by a crown of ring sectors 20 of which there are eight in the embodiment shown. The spacing between the two planar annular zones 18 is much smaller than the smallest inner diameter of the body 12, the ratio between the spacing and the inner diameter preferably being about 1:3 to 2:3. In the embodiment shown the ratio is 1:2.

The ring sectors 20 overlap each other and are disposed obliquely in the fashion of fan blades such that their leading edges 22 in the operating direction of rotation of the drum 10 are disposed further outside than their trailing edges 24. The direction of rotation during operation is marked by an arrow 26 in FIGS. 1 and 4. A gap-like passage 28 remains open between two successive ring sectors 20 each. Thus each of the two end walls 14 has eight such passages 28 extending approximately for one third of the radius of the drum from the body 12 to the corresponding annular zone 18 which is closed, apart from its central aperture 16.

Preferably the ring sectors 20 of each of the two end walls 14 are made integral with or welded to the associated planar annular zone 18. Moreover, the ring sectors 20 of each of the two end walls 14 are welded to an axially outer, annular collecting channel 30 which is centered at the body 12 and attached to the same by bolts. A wider or narrower body than the one 12 shown may be positioned between the two end walls 14.

The drum 10 designed as described above is inserted in the space between two posts 32 each carrying a roller pair 34 on which the body 12 is adapted to roll off by its cylindrical outer surface. One of the roller pairs 34 is adapted to be driven in rotation by a geared engine means 36.

A pair each of hollow arms 38 extend radially from each of the two posts 32 in the direction toward the axis of rotation A and so as to embrace the drum 10. The hollow arms 38 are removably mounted on each of the posts 32 and carry two annular hoods 40 disposed at either side of the drum 10 and slightly spaced from the respective end wall 14 which they cover entirely. They also extend across the respective collecting channel 30 in such manner as to form a kind of contactless labyrinth seal together with the same.

A central cover 42 each is hingedly connected to both hoods 40. When closed, this cover is in contactless sealing engagement in the central aperture 16 of the respective end wall 14 together with the planar annular zone 18 of which it constitutes a substantially planar, sealed central portion. Below the central cover 42 each of the two hoods 40 further comprises a discharge flap 44 of ring sector shape.

Likewise formed in an area below the axis of rotation A and contiguous with the two crowns of ring sectors 20 is a suction chamber 46 each, of ring sector shape. Each suction chamber 46 is defined axially outwardly by the corresponding hood 40 and at the front and rear ends, as seen in the direction of rotation of the drum 10, by a radial wall 48 each. The two suction chambers 46 are interconnected by the pairs of hollow arms 38 and communicate with the suction end of a fan (not shown) through a common suction conduit 50.

Figure 1:
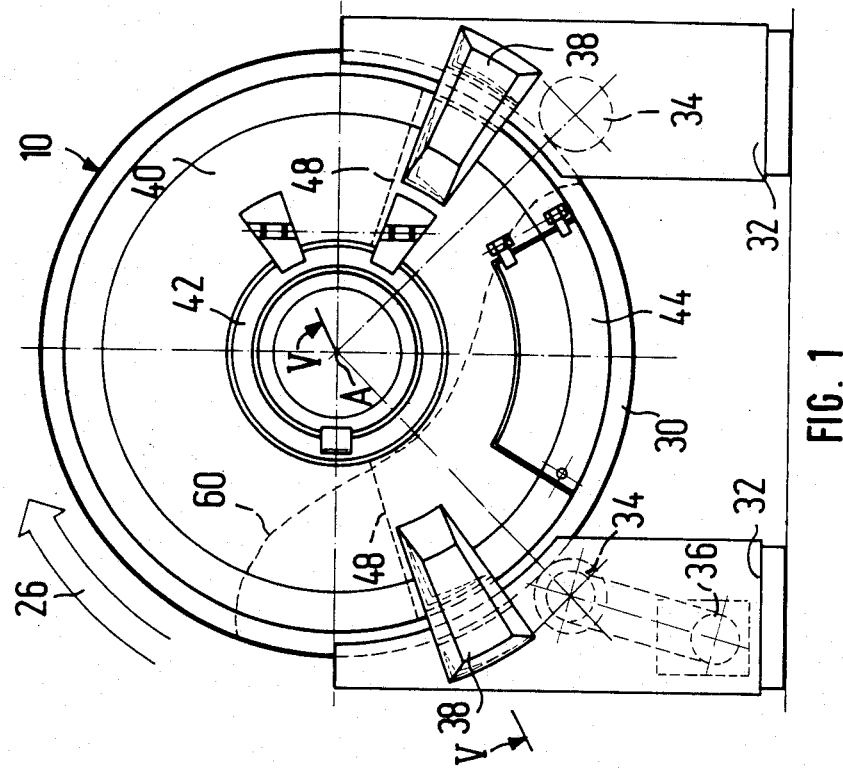
FIG. 1 is a front elevational view of an apparatus suitable for granulating, pelleting, coating, or drying fluid material, in normal operation.
Figure 4:
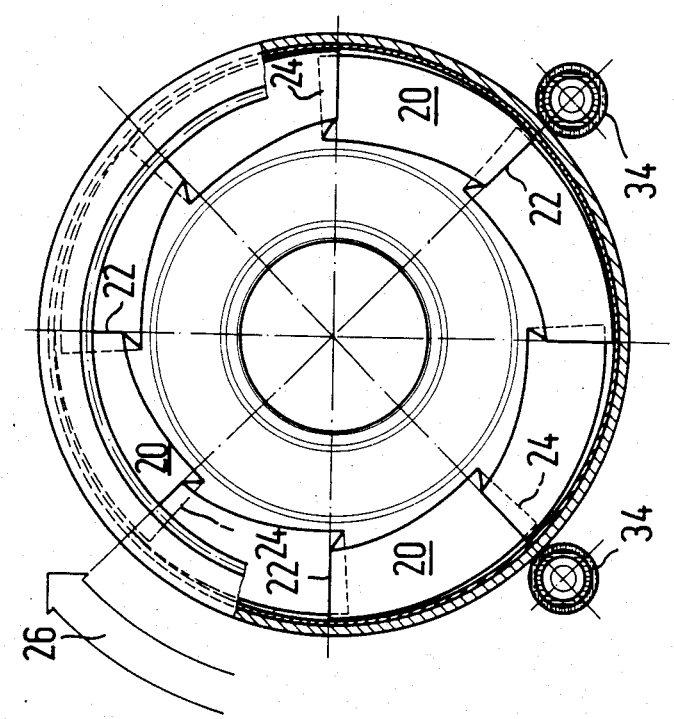
FIG. 4 is a radial sectional view along lines IV—IV of FIG. 3.

In the embodiment shown in FIG. 3 the right one of the two central covers 42 is provided with an inspection glass, while the left one is formed with openings for passage of a fresh gas conduit 52 and a liquid conduit 54 extending into the space 56 enclosed by the drum 10. The space 56 is partly filled with material 58 to be treated. The treatment may consist in alternatingly spraying a liquid introduced through the liquid conduit 54 on initiating nuclei which were filled in through the right cover 42 in FIG. 3 and drying those nuclei by hot dry air from the fresh gas conduit 52 while the drum 10 is driven in the direction of arrow 26. This will create the material 58 the quantity of which increases gradually. As the drum 10 rotates, it takes along the material 58 which forms a cataract the surface 60 of which is indicated in FIGS. 1 and 3. Spent air which is saturated with moisture is sucked off in part through the material 58 and in part directly from its surface 60 and into the suction chambers 46 past which the passages 28 travel one after the other.

Figure 2:
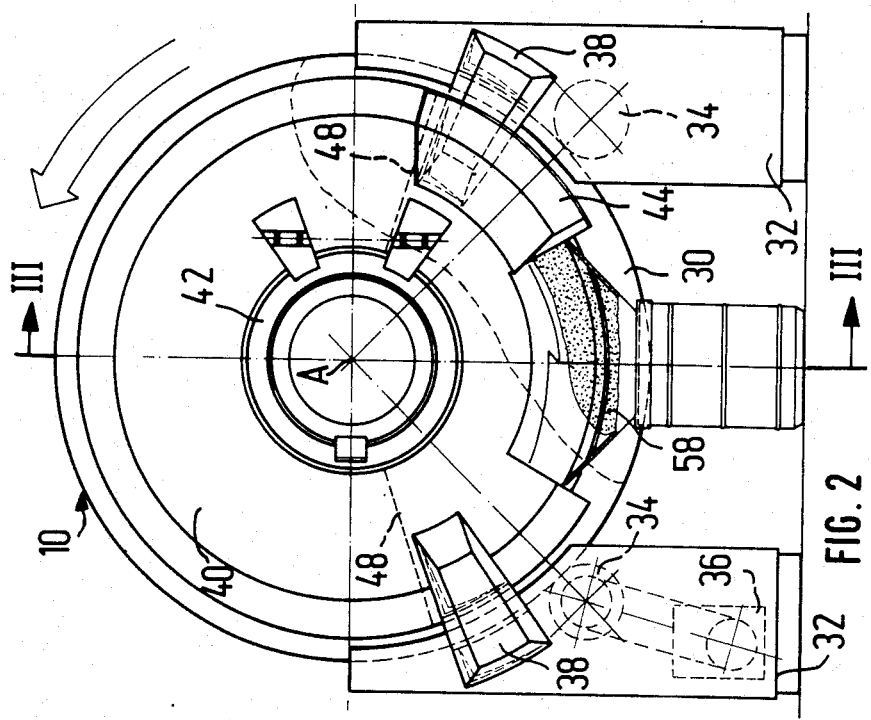
FIG. 2 is a corresponding front elevational view of the apparatus during discharge.

When the treatment of the material is completed, the direction of rotation of the drum 10 is reversed, as indicated in FIG. 2. Upon rotation in reverse sense the material 58 is conveyed axially outwardly by the ring sectors 20, flowing into the annular collecting channels 30 and then dropping into containers 62.

Fundamentally it is sufficient if one of the two end walls 14 comprises a crown of ring sectors 20 and passages 28 in between, as described above. In this case the drum 10 may be vented and emptied only through this one end wall. Therefore, it is convenient in this instance if the inner diameter of the body 12 increases steadily toward the respective end wall. In general, however, the structure shown which includes two crowns of ring sectors will be preferred because it permits more thorough venting and quicker discharge of the material 58.

The embodiment illustrated in FIG. 6 differs from the one described above with reference to FIGS. 1 to 5 practically in that the ring sectors 20 of each end wall 14 which are arranged obliquely like a propeller, furthermore, are inclined axially inwardly so as to form a frustum which extends axially inwardly.

What is claimed is:

1. An apparatus for granulating, pelleting, coating or drying fluid material comprising a drum rotatable about an at least approximately horizontal axis, said drum comprising
(a) an at least approximately cylindrical body,
(b) two end walls, one at each end of the cylindrical body, and
(c) at least one annular crown formed from a plurality of overlapping ring sectors disposed on the radially outward portion of the interior side of at least one of the end walls, wherein each ring sector has a leading edge extending in the operating direction of rotation of the drum, and a trailing edge on the opposite end of the ring sector, and each ring sector overlaps with the immediately adjacent ring sector such that the leading edge of each ring sector is disposed axially outward from the trailing edge of the immediately adjacent ring sector to form a gap-like passage between adjacent ring sectors through which the fluid material passes upon reverse rotation of the drum, and wherein the portion of the end wall which is radially inward from the crown is not penetrable by the fluid material.

2. The apparatus as claimed in claim 1, wherein the body (12) of the drum (10) has a central zone the inner diameter of which is somewhat smaller than the inner diameter at end sections of the drum (10) each of which is bordered by a crown of ring sectors (20).

3. The apparatus as claimed in claim 1 or 2, wherein an annular collecting channel (30) is formed at the drum (10) axially outside of the ring sectors (20) for material (58) which exited through the passages.

4. The apparatus as claimed in claims 1 or 2, wherein a suction chamber (46) is arranged axially outside of the ring sectors (20) below the axis of rotation (A) and is adapted to be connected to a suction conduit (50) for sucking gas out of the material (58).

5. The apparatus as claimed in claim 4, wherein the suction chamber (46) is defined axially outwardly by a stationary hood (40) which substantially covers the respective end wall (14) of the drum (10).

6. The apparatus as claimed in one of claims 1 or 2, wherein the central portion (18,42) which is not penetrable by the material (58) comprises a central cover (42) which, in operation, seals a central aperture (16) formed in the corresponding end wall (14) of the drum (10).

7. The apparatus as claimed in claim 6, wherein the central cover (42) is pivoted at the hood (40).

8. The apparatus as claimed in claim 7, wherein a discharge flap (44) is disposed at the hood (40) below the central cover (42).

9. The apparatus as claimed in claim 8, wherein the central aperture (16) is surrounded by a planar annular zone (18) of the end wall (14).

10. The apparatus as claimed in one of claims 1 or 2, wherein the ring sectors (20) are designed to approach the form of a frustum which extends into the space (56) enclosed by the body (12).

* * * * *